(12) United States Patent
Mayama

(10) Patent No.: US 6,518,713 B2
(45) Date of Patent: Feb. 11, 2003

(54) METHOD OF ILLUMINATING INCANDESCENT LAMP, AND CIRCUIT FOR ILLUMINATING THE SAME

(75) Inventor: Syuji Mayama, Nagoya (JP)

(73) Assignees: Autonetworks Technologies, Ltd., Nagoya (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/043,116

(22) Filed: Jan. 14, 2002

(65) Prior Publication Data

US 2002/0093293 A1 Jul. 18, 2002

(30) Foreign Application Priority Data

Jan. 16, 2001 (JP) .......................................... 2001-007940

(51) Int. Cl.[7] .............................................. H05B 37/02
(52) U.S. Cl. ........................................ 315/224; 315/240
(58) Field of Search ........................... 315/224, DIG. 7, 315/209 R, 240

(56) References Cited

U.S. PATENT DOCUMENTS 5,708,330 A  *  1/1998  Rothenbuhler et al. ...... 315/244

FOREIGN PATENT DOCUMENTS

JP              8-171813           7/1996

* cited by examiner

*Primary Examiner*—David Vu
(74) *Attorney, Agent, or Firm*—Oliff & Berridge, PLC

(57) ABSTRACT

An incandescent lamp 12 and a MOSFET 14 are connected in series with a power supply. A capacitor 164 is interposed between the gate G of the MOSFET 14 and a reference potential. Electric charges are gradually stored in the capacitor 164, thereby gradually increasing the voltage level of the control signal to be supplied to the gate G.

8 Claims, 3 Drawing Sheets

METHOD OF ILLUMINATING INCANDESCENT LAMP, AND CIRCUIT FOR ILLUMINATING THE SAME

BACKGROUD OF THE INVENTION

1. Technical Field

The present invention relates to a method and circuit for illuminating an incandescent lamp which suppresses flow of an inrush current, which would otherwise arise at the time of illumination of the incandescent lamp.

2. Related Art

In relation to a related-art circuit for illuminating an incandescent lamp, such as a vehicle-installed lamp, a switch such as a mechanical switch or a semiconductor switch is provided in the illumination circuit. Illumination and extinguishing of the incandescent lamp are effected, by means of activating or deactivating the switch. As described in the Unexamined Japanese Patent Application Publication No. Hei8-171813, there has been proposed that a thermistor possessing a negative characteristic be inserted into the illumination circuit along with the switch, thereby suppressing flow of an inrush current into the incandescent lamp at the beginning of energization of the incandescent lamp.

[Problems to be Solved]

However, in a situation in which only the switch is inserted into the illumination circuit, when the incandescent lamp is not illuminated, a filament of the incandescent lamp is cold and has low resistance. Hence, a large inrush current flows into the incandescent lamp at the beginning of energization resulting from activation of a switch, thereby shortening the life of the filament. If a large inrush current flows into the incandescent lamp, fluctuations will arise in a supply voltage, which may adversely affect another electronic device.

When a thermistor having a negative characteristic is inserted into the illumination circuit, flow of a large inrush current into the incandescent lamp is suppressed, because the thermistor has large resistance at the beginning of energization. After lapse of a predetermined period of time, the resistance of the thermistor decreases. Hence, a rated current flows into the incandescent lamp and enters a normal illuminated state. However, even in a normal illuminated state, the thermistor has predetermined resistance, and hence an electric current is wastefully dissipated.

SUMMARY OF THE INVENTION

The present invention is conceived in view of the foregoing circumstances and aims at providing a method and circuit for illuminating an incandescent lamp which enable effective suppression of flow of an inrush current into the incandescent lamp without involvement of wasteful dissipation of power.

[Means for Solving the Problems]

To achieve the object, the present invention provides An incandescent lamp illumination method, wherein an incandescent lamp and a semiconductor switch element having a control terminal are connected in series with a power supply, and the incandescent lamp is illuminating by means of supplying a control signal to the control terminal to thereby bring the semiconductor switch element into conduction, the method comprising the step of: suppressing conduction of the semiconductor switching element, by means of reducing a voltage level of the control signal to be supplied to the control terminal so as to become lower than a voltage level obtained at the time of normal illumination of the incandescent lamp, at the beginning of energization of the incandescent lamp.

According to the method, at the beginning of conduction, filament resistance of the incandescent lamp is low. At this time, a voltage level of a control signal supplied to the control terminal of the semiconductor switch element is lower than that obtained at the time of normal illumination of the incandescent lamp, so that conduction of the semiconductor switch element is suppressed, to thereby hinder flow of a large current. Consequently, flow of an inrush current into the incandescent lamp is suppressed. When a predetermined period of time has elapsed, the control signal to be supplied to the control terminal is set to the voltage level obtained at the time of normal illumination of the incandescent lamp, thus bringing the incandescent lamp into a normal illuminated state.

Preferably, the voltage level of the control signal is gradually increased, thereby gradually bringing the semiconductor switch into conduction.

According to the method, the voltage level of the control signal is gradually increased, thereby gradually bringing the semiconductor switch element into conduction. At the beginning of energization, the conduction of the semiconductor switch is suppressed, thereby inhibiting flow of a great electric current. In contrast, when a predetermined period of time has elapsed, the voltage level of the control signal supplied to the control terminal becomes large, thereby bringing the semiconductor switch element into normal continuity. Thus, the incandescent lamp is brought into a normal illuminated state.

The present invention provides an incandescent lamp illumination circuit, wherein an incandescent lamp and a semiconductor switch element having a control terminal are connected in series with a power supply, and the incandescent lamp is illuminating by means of supplying a control signal to the control terminal to there by bring the semiconductor switch element into conduction, the circuit comprising: control signal supply means for supplying a control signal to the control terminal; and signal level control means for suppressing energization of the semiconductor switch element, by means of reducing a voltage level of the control signal to be supplied to the control terminal so as to become lower than a voltage level obtained at the time of normal illumination of the incandescent lamp, at the beginning of energization of the incandescent lamp.

By means of this configuration, at the beginning of energization, the incandescent lamp has low filament resistance. At this time, a voltage level of the control signal supplied to the control terminal of the semiconductor switch element is lower than that obtained at the time of normal illumination of the incandescent lamp. Hence, energization of the semiconductor switch is suppressed, thereby inhibiting flow of a large current. Consequently, flow of an inrush current into the incandescent lamp is suppressed. When a predetermined period of time has elapsed, a control signal to be supplied to the control terminal is brought to a voltage level obtained at the time of normal illumination of the incandescent lamp, thereby bringing the incandescent lamp into a normal illuminated state.

Preferably, the signal level control means gradually brings the semiconductor switch element into conduction, by means of gradually increasing a voltage level of the control signal.

By means of the configuration, the voltage level of the control signal is gradually increased, thereby gradually bringing the semiconductor switch element into conduction. At the beginning of energization, the conduction of the semiconductor switch is suppressed, thereby inhibiting flow of a great electric current. In contrast, when a predetermined period of time has elapsed, the voltage level of the control signal supplied to the control terminal becomes large, thereby bringing the semiconductor switch element into normal continuity. Thus, the incandescent lamp is brought into a normal illuminated state.

Preferably, the signal level control means is constituted of a time-constant circuit comprising a resistance element and a capacitor; the resistance element is interposed between the control signal supply means and the control terminal; the capacitor is between the control terminal and a reference potential.

By means of the configuration, electric charge is stored in the capacitor in accordance with a time constant-which is defined by a product of the resistance of the resistance element and the electrostatic capacitance value of the capacitor-and hence the voltage level of the control signal increases gradually. Consequently, the semiconductor switch element is gradually brought into the state of conduction. At the beginning of energization, the conduction of the semiconductor switch element is suppressed, thereby inhibiting inflow of a large inrush current into the incandescent lamp.

Preferably, the control signal supply means outputs a pulse signal, and a current direction regulation element is interposed between the control terminal and the capacitor for enabling passage of an electric current during only an ON period of the pulse signal.

By means of the configuration, electric charge is stored in the capacitor via the current direction regulation element at the time of an ON period of the pulse signal; that is, when the pulse signal is at a high level. At the time of an OFF period of the pulse signal; that is, when the pulse signal is at a low level, presence of the current direction regulation element prevents discharge of the electric charge stored in the capacitor. Hence, the potential of the control terminal reaches a predetermined level within a predetermined period of time without fail.

Preferably, the current direction regulation element is a diode.

Preferably, a discharge resistance element is connected in parallel with the capacitor.

By means of the configuration, supply of the control signal to the control terminal is stopped, thereby bringing the incandescent lamp into an extinguished state from an illuminated state. At this time, the electric charge stored in the capacitor is discharged via the discharge resistance element. Consequently, even when the control signal is again supplied to the control terminal, flow of an inrush current into the incandescent lamp is suppressed without fail. So long as discharge of electric charge is set so as to finish before the filament of the incandescent lamp becomes cold, flow of a large inrush current can be prevented by the electrical resistance of the filament still having a high value even when the control signal is supplied to the control terminal before completion of discharge.

BRIEF DESCRIPTION OF THE DRAWINGS

FIG. 1 is a circuit diagram showing an incandescent lamp illumination circuit according to a first embodiment of the present invention;

FIG. 2 is a timing chart, showing a voltage waveform of a control signal output to a signal output terminal in the incandescent lamp illumination circuit shown in FIG. 1, a waveform of a voltage across a capacitor, a voltage waveform of a control signal appearing at a gate of a MOSFET; and

FIG. 3 is a circuit diagram showing an incandescent lamp illumination circuit according to a second embodiment of the present invention.

DETAILED DESCRIPTION OF THE PREFERRED EMBODIMENTS

[Mode for Implementing the Invention]

Figure 1:
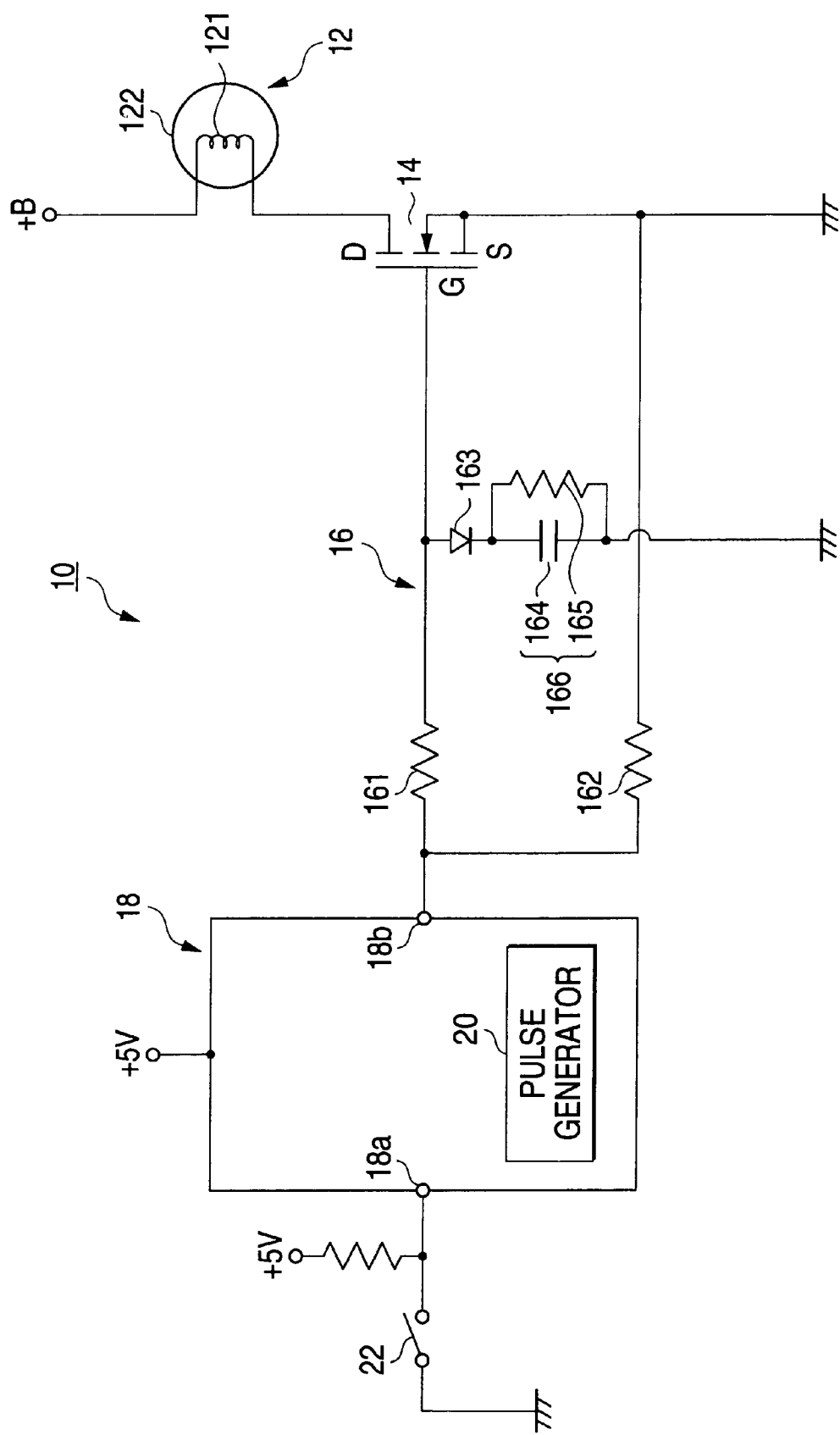
[FIG. 1]

FIG. 1 is a circuit diagram showing the configuration of an incandescent lamp to which a method of illuminating an incandescent lamp according to a first embodiment of the present invention is applied. In relation to the diagram, an incandescent lamp illumination circuit 10 is to be installed in a vehicle, such as an automobile, in the present embodiment. The illumination circuit 10 comprises an incandescent lamp 12; an n-channel MOSFET 14 which is a semiconductor switching element having a control terminal and connected in series with the incandescent lamp 12; a signal level control section 16 for controlling operation of the MOSFET 14; and a control section 18 for supplying a control signal (i.e., a pulse signal) to the MOSFET 14 via the signal level control section 16.

The incandescent lamp 12 is constituted by sheathing a filament 121 with a glass cladding 122. An inactive gas, such as Argon gas, is sealed in the glass cladding 122, thereby preventing burning of the filament 121. One end of the filament 121 is connected to a +B terminal of a battery, and the other end of the filament 121 is connected to the MOSFET 14.

The MOSFET 14 is of, e.g., enhanced type and has a drain D connected to the incandescent lamp 12, a source S connected to a ground which serves as a reference potential, and a gate G which is to act as a control terminal and is connected to the signal level control section 16.

The signal level control section 16 controls a voltage level (voltage value) of a control signal supplied to the gate G of the MOSFET 14 so as to gradually increase from a low value to a higher value (a voltage level at the time of normal illumination). The signal level control section 16 comprises a first resistance element 161 interposed between the control section 18 and the gate G of the MOSFET 14; a second resistance element 162 interposed between the control section 18 and the source S of the MOSFET 14; a diode 163 whose anode is connected to the gate G of the MOSFET 14; and a CR parallel circuit 166 which is constituted of a combination of a capacitor 164 and a third resistance element 165 and is interposed between the cathode of the diode 163 and a ground serving as the reference potential.

The first resistance element 161 prevents parasitic oscillation of the MOSFET 14, sets a charge time with respect to gate parasitic capacitance, and constitutes a time-constant circuit in conjunction with the capacitor 164. The second resistance element 162 is for discharging electric charge from the gate parasitic capacitance. The third resistance element 165 is for discharging electric charge accumulated in the capacitor 164. The diode 163 enables flow of an electric current from the gate G of the MOSFET 14 to the reference potential during only the ON period of a pulse signal output from the control section 18. The resistance value of the first resistance element 161, that of the third resistance element 165, and the electrostatic capacity of the capacitor 164 are set such that a time constant defined by the third resistance element 165 and the capacitor 164 becomes greater than that defined by the first resistance element 161 and the capacitor 165.

The control section 18 comprises a microcomputer consisting of a CPU (central processing unit) for performing an arithmetic operation, ROM (read-only memory) having stored therein a processing program and various types of data, and RAM (random-access memory) for temporarily storing processed data. The microcomputer controls operation of a pulse generator 20, which serves as control signal supply means constituted of a multi-vibrator built in the control section 18.

The control section 18 has a signal input terminal 18a into which an operation signal produced by an operation switch 22 of the incandescent lamp 12 is input, and a signal output terminal 18b which supplies a pulse signal of predetermined duty ratio produced by the pulse generator 20 to the gate G of the MOSFET 14 via the signal level control section 16.

In the incandescent lamp illumination circuit 10 having the foregoing construction, an illumination instruction signal produced as a result of activation of the operation switch 22 is input to the signal input terminal 18a of the control section 18. A control signal set to a predetermined duty ratio is output from the signal output terminal 18b. The control signal is supplied (applied) to the gate G of the MOSFET 16 via the signal level control section 16. The potential of the gate G is in a low state, because electric charge is not stored in the capacitor 164 at the beginning of output of an illumination instruction signal. During a period of high level; that is, during an ON period of the control signal, electric charge is gradually accumulated in the capacitor 164 via the diode 163, whereby the potential of the gate G gradually becomes high.

The electric charges stored in the capacitor 164 are discharged during a period of low level; that is, during an OFF period of the control signal via the third resistance element 165. Since the time constant defined by the third resistance element 165 and the capacitor 164 is greater than that defined by the first resistance element 161 and the capacitor 164, the capacitor 164 is recharged before starting substantial electric discharge. Presence of the diode 163 in the direction opposite to the capacitor 164 when viewed from the capacitor 164 hinders occurrence of electric discharge of the capacitor 164 via the first resistance element 161 and the second resistance element 162. Consequently, electric charges are effectively stored in the capacitor 164.

For this reason, the drain D and the source S are gradually brought into conduction, and an electric current gradually starts flowing into the filament 121 of the incandescent lamp 12. When electric charges have been stored in accordance with electrostatic capacitance of the capacitor 164 after lapse of a given period of time, the MOSFET 14 is brought into normal conduction, and a specified electric current flows into the incandescent lamp 12. Thus, the incandescent lamp 12 enters a normal illuminated state. For this reason, there is prevented shortening of the life of the filament 121. Further, there is prevented occurrence of changes in supply voltage, which would in turn affect other device. Moreover, there is prevented wasteful dissipation of power, which would have been caused by the related-art thermistor. Hence, flow of an inrush current into the incandescent lamp 12 can be suppressed effectively.

An extinction instruction signal generated as a result of deactivation of the operation switch 22 is input to the signal input terminal 18a of the control section 18. Output of the control signal from the signal output terminal 18 is stopped. Then, the electric charges stored in the capacitor 164 are discharged via the third resistance element 165, whereupon the potential of the gate G of the MOSFET 14 drops gradually. Even when the illumination instruction signal is again input to the signal input terminal 18a, flow of an inrush current into the incandescent lamp 12 is effectively controlled, by means of operation of the signal level control section 16 in a phase in which electric discharge of the capacitor has been completed.

The time constant of a CR parallel circuit 166 is set such that electric discharges is completed before a large drop has arisen in the temperature of the filament 121 of the incandescent lamp 12 as well as in the resistance of the filament 121. Even when the illumination instruction signal is again input to the signal input terminal 18a before completion of electric discharge, flow of a large in-rush current can be prevented by means of electrical resistance of the filament 121. As mentioned above, when the illumination instruction signal is output before completion of electric discharge, conduction of the MOSFET 14 is not much inhibited. For this reason, there can be prevented heating of the MOSFET 14, which would otherwise be caused by an increase in ON resistance between the drain and the source.

Figure 2:
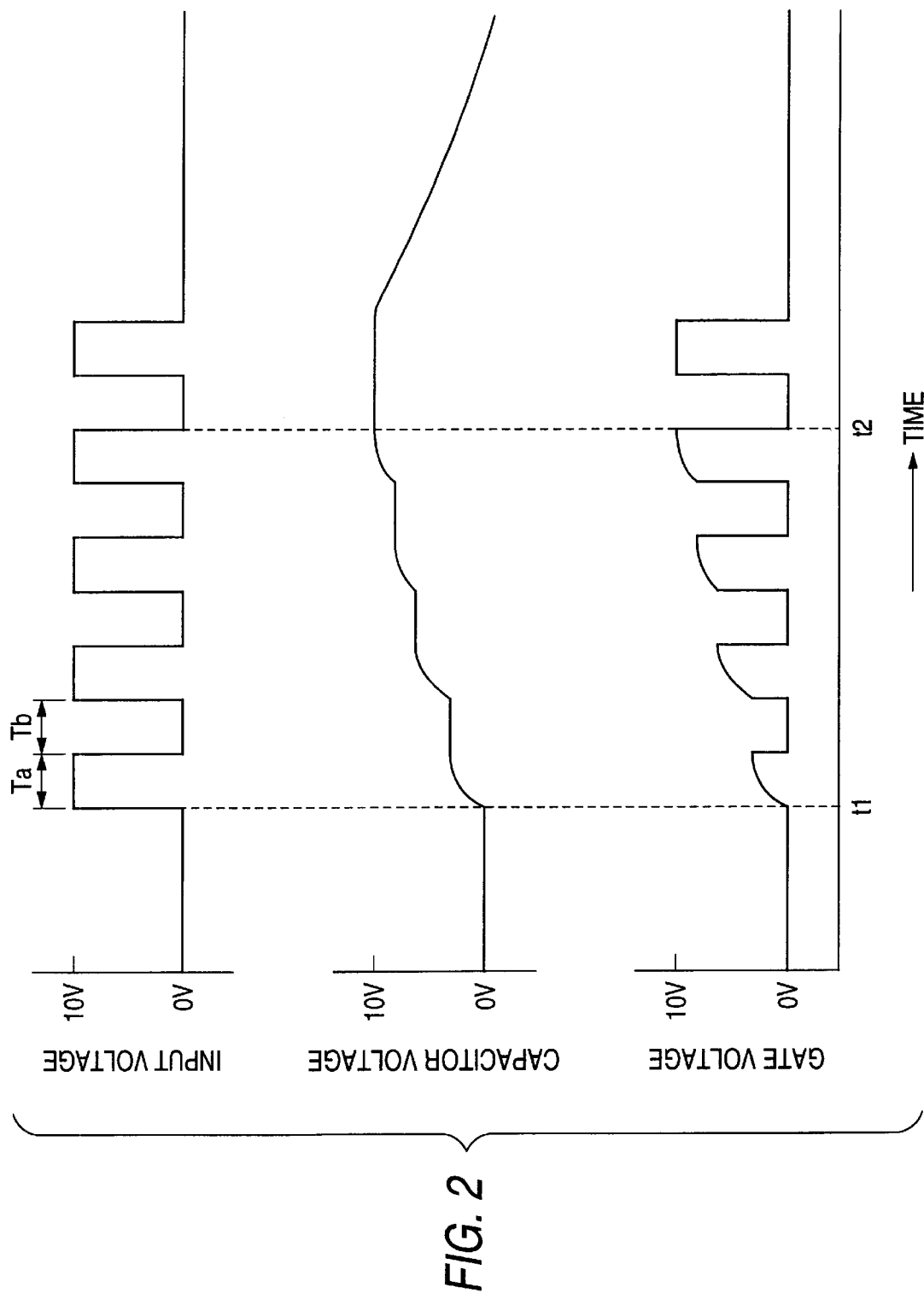
[FIG. 2]

FIG. 2 is a timing chart, showing a voltage waveform of a control signal (input voltage) output to the signal output terminal 18b of the control section 18; the waveform of a voltage developing across the capacitor 164 (capacitor voltage); and the waveform of voltage of a control signal (gate voltage) appearing in the gate G of the MOSFET 14. When the operation switch 22 is turned on at time t1, a control signal consisting of a pulse signal (having e.g., a high level of 10 V and a low level of 0 V) of predetermined duty ratio (here a duty ratio D=0.5) is consecutively output to the signal output terminal 18b.

At time t1, no electric charges are accumulated in the capacitor 164. Hence, the potential appearing across the capacitor 164 is zero. As a result of electric charges being recharged during an ON period of the control signal; that is a high-level period Ta, a potential appearing across the capacitor 164 gradually increases. At time t2, recharging of the capacitor 164 is finished, and the potential appearing across the capacitor 164 reaches to a specified value (e.g., 10 V) Later, the potential of the capacitor is maintained.

At time t1, the potential developing across the capacitor 164 is zero. Hence, the potential of the gate G of the MOSFET 14 remains zero. Since the voltage across the capacitor 164 increases gradually, a voltage equal in magnitude with the potential across the capacitor 164 is supplied to the gate G of the MOSFET 14 during only a period of Ta in which the control signal remains in a high level. At time t2 at which recharging of the capacitor 164 is completed and in a subsequent phase, a voltage of specified value (e.g., 10 V) appearing at the time of normal illumination of the incandescent lamp is supplied.

Even during a period Tb during which the control signal is in a low level, the potential across the capacitor 164 has a magnitude corresponding to the period of recharging time. Presence of the diode 163 in the direction opposite to the capacitor 164 when viewed from the capacitor 164 hinders supply of the voltage across the capacitor 164 to the gate G of the MOSFET 14. Hence, the potential of the gate G during the period Tb in which the control signal is in a low level becomes zero.

The drain D and the source S of the MOSFET 14 are gradually brought into conduction with a gradual increase in the voltage level of the control signal supplied to the gate G (namely, a drain current corresponding to the magnitude of the control signal flows into the gate G). Hence, flow of a large inrush current into the incandescent lamp 12 at the beginning of energization is prevented.

Figure 3:
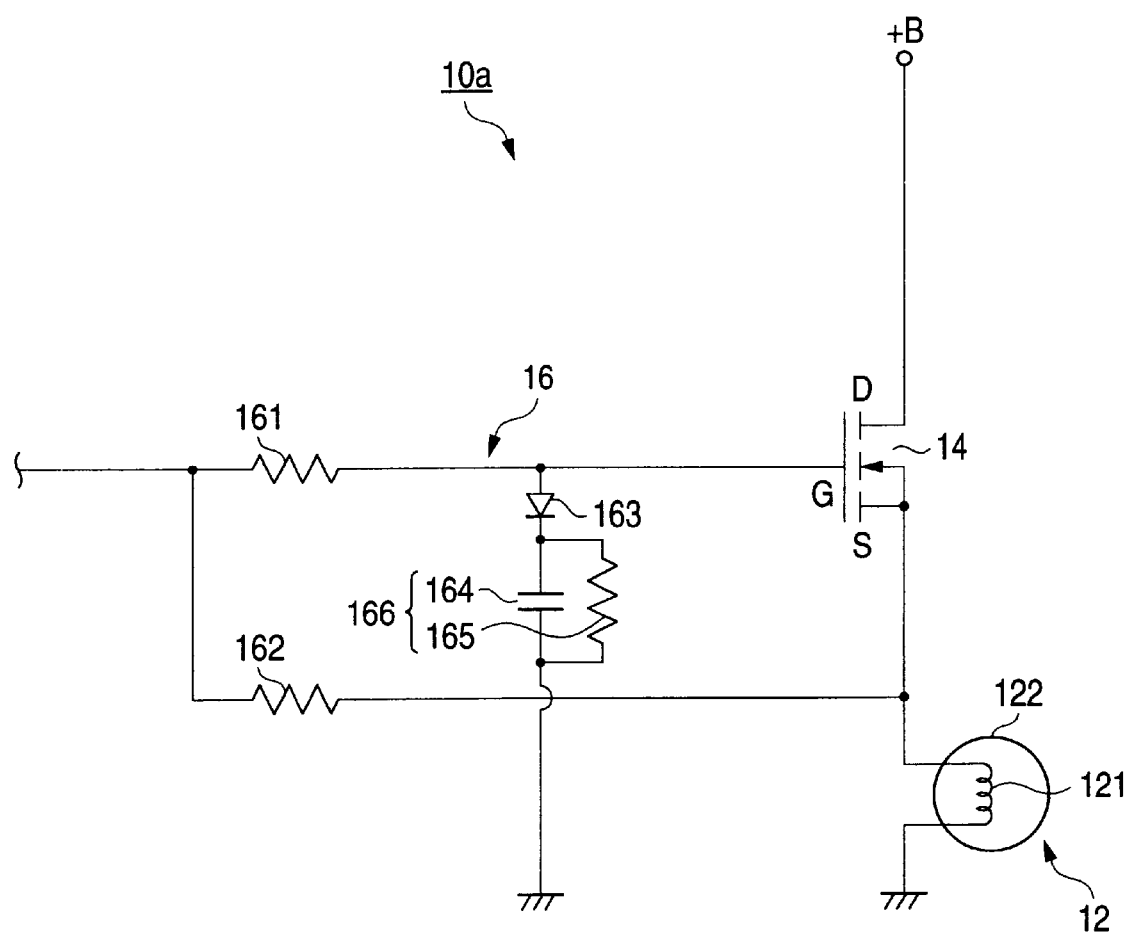
[FIG. 3]

FIG. 3 is a circuit diagram showing the configuration of the incandescent lamp illumination circuit 10a according to a second embodiment of the present invention. The incandescent lamp illumination circuit according to the present embodiment is identical in configuration with that shown in FIG. 1 and described in connection with the first embodiment, except that the incandescent lamp 12 is provided in the reference voltage part of circuitry, and the MOSFET 14 is connected to the +B terminal. Those elements which are the same as the constituent elements shown in FIG. 1 are assigned the same reference numerals, and their detailed explanations are omitted. Even the incandescent lamp illumination circuit having the foregoing configuration yields completely the same working-effect as that yielded in the first embodiment shown in FIG. 1.

In the incandescent lamp illumination circuit 10a according to the second embodiment, a terminal of the CR parallel circuit 166, differing from a terminal of the same opposing the diode 163, may be connected directly not to the reference potential but to the source S of the MOSFET 14 and further to the reference potential via the filament 121 of the incandescent lamp 12. Even in such a configuration, the incandescent lamp illumination circuit 10a operates completely in the same manner as in the case of the terminal of the CR parallel circuit 166, differing from the terminal of the same opposing the diode 163, is connected directly to the reference potential.

By means of the incandescent lamp illumination method and the incandescent lamp illumination circuit according to the present invention, as in the case of the embodiments, the MOSFET 14 is gradually brought into conduction, by means of gradually increasing the voltage level of the control signal supplied to the gate G of the MOSFET 14 through use of the signal level control section 16, thereby suppressing conduction of the MOSFET 14 at the beginning of energization. Flow of an inrush current into the incandescent lamp can be suppressed effectively without involvement of wasteful power dissipation. In a normal illuminated state of the incandescent lamp, conduction of the MOSFET 14 is not suppressed. Hence, there is prevented occurrence of an increase in loss, which would otherwise be caused when ON resistance between the drain and the source of the MOSFET 14 increases in a normal illuminated state. For this reason, there is obviated a necessity for making a heatsink to be attached to the MOSFET 14 larger than required.

The present invention is not limited to the embodiments, and various modifications such as those mentioned below can be adopted.

(1) In the embodiments, the second resistance element 162 is provided in the signal level control section 16. However, use of the second resistance element 162 is not inevitable. For instance, even when the electric charges stored in the gate parasitic capacitance of the MOSFET 14 must be discharged, the electric charges can be discharged by means of the third resistance element 165.

(2) In the embodiments, the MOSFET 14 is employed as a semiconductor switch element having a control terminal. However, the semiconductor switch element is not limited to the MOSFET. For instance, another type of semiconductor switch element having a control terminal such as a bipolar transistor or an IGBT constituted of a combination of a MOSFET and a bipolar transistor. In short, there can be employed a semiconductor switch which is gradually brought into conduction with an increase in the voltage level of the control signal supplied to the control terminal.

(3) In the embodiments, the diode 163 is employed as a current direction regulation element to be interposed between the gate G of the MOSFET 14 and the capacitor 164. However, the current direction regulation element is not limited to a diode. For instance, there may be employed, as a substitute for a diode, a bipolar transistor, a MOSFET, or a semiconductor switch element having a control terminal, such as an SCR. In this case, in synchronism with an ON period of the pulse signal output from the signal output terminal 18b, the control signal is supplied to the control terminal (the base of a bipolar transistor when the current direction regulation element is embodied as a bipolar transistor, or the gate of an MOSFET or SCR when the current direction regulation element is embodied as a MOSFET or SCR), thereby bringing the semiconductor switch element into conduction during only the ON period of the pulse signal.

(4) In the embodiments, the signal level control section 16 is constituted a time constant circuit consisting of the first resistance element 161 and the second resistance element 164. However, the signal level control section is not limited to the time constant circuit. For example, the signal level control section may be constituted of a potential divider for dividing a pulse signal, which acts as a control signal to be output from the signal output terminal 20b of the control section 18, into a plurality of voltage levels. More specifically, the potential divider may be connected to the signal output terminal 20b, and the voltage level maybe switched sequentially from a lower value to a higher value. In this case, a voltage is divided into only two potential levels, and a voltage can be supplied such that, at the beginning of energization, a voltage-which is lower than that required at the time of normal illumination of an incandescent lamp-is supplied and such that a voltage-which is higher than that required at the time of normal illumination of an incandescent lamp-can be supplied after lapse of a predetermined period of time.

(5) In the embodiments, there is adopted a PWM control method, wherein flow of an electric current into the incandescent lamp 12 is controlled by means of supplying a pulse signal to the gate G of the MOSFET 14. However, the present invention is not limited to the PWM control method. For instance, the control signal to be supplied to the gate G of the MOSFET 14 is made of a d.c. voltage. The state of continuity between the drain D and the source S of the MOSFET 14 is changed, by means of changing the level of the d.c. voltage, thereby controlling flow of an electric current into the incandescent lamp 12. When the control signal is made of a d.c. voltage in this way, use of the diode 163 is not necessarily. Further, when the control signal is made of a d.c. voltage, the electric charges stored in the capacitor 164 can be discharged, by means of the first resistance element 161 without use of the third resistance element 165. Although the control section 18 is constituted of a microcomputer, the control section may also be constituted of an analog circuit such as an operational amplifier.

In a situation in which a change has arisen in specifications of the voltage of a battery for a vehicle such as an automobile from a current voltage of 12 V to, e.g., 42 V, if the filament of the incandescent lamp is made narrower, the life of the incandescent lamp may be shortened. For this reason, in a case where an incandescent lamp illumination circuit is configured, the duty ratio of the control signal is reduced, by use of the PWM control method such as that described in connection with the embodiments, thereby enabling use of a related-art 12 V lamp. In this case, a source voltage as large as 42 V is applied to the 12 V lamp at the beginning of energization. As a result, a large inrush current proportional to an increase in the source voltage flows into the lamp. However, adoption of the illumination method and circuit according to the present invention enables effective inhibition of flow of such an inrush current.

(6) In the embodiments, the incandescent lamp illumination circuits 10, 10a have been described to be installed in a vehicle, such as an automobile. However, the circuits may be utilized for something other than a vehicle.

[Advantage of the Invention]

As has been described, according to the present invention, the voltage level of the control signal to be supplied to the control terminal is made lower than a voltage level obtained at the time of normal illumination of the incandescent lamp, at the beginning of energization of the incandescent lamp, thus inhibiting conduction of the semiconductor switch element. Flow of an inrush current into the incandescent lamp can be effectively inhibited without wasteful power dissipation.

What is claimed is:

1. An incandescent lamp illumination method, comprising the steps of:

connecting an incandescent lamp and a semiconductor switch element having a control terminal in series with a power supply, supplying a control signal to said control terminal, and bringing said semiconductor switch element into conduction to illuminate said incandescent lamp, wherein conduction of said semiconductor switching element is suppressed by reducing a voltage level of the control signal to be supplied to said control terminal so as to become lower than a voltage level obtained at the time of normal illumination of said incandescent lamp, at the beginning of energization of said incandescent lamp.

2. The incandescent lamp illumination method according to claim 1, wherein the voltage level of the control signal is gradually increased, and said semiconductor switch is gradually brought into conduction.

3. An incandescent lamp illumination circuit, wherein an incandescent lamp and a semiconductor switch element having a control terminal are connected in series with a power supply, and said incandescent lamp is illuminating by supplying a control signal to said control terminal to bring said semiconductor switch element into conduction, said incandescent lamp illumination circuit comprising:
        control signal supply means for supplying a control signal to said control terminal; and
        signal level control means for suppressing energization of said semiconductor switch element, by reducing a voltage level of the control signal to be supplied to said control terminal so as to become lower than a voltage level obtained at the time of normal illumination of said incandescent lamp, at the beginning of energization of said incandescent lamp.

4. The incandescent lamp illumination circuit according to claim 3, wherein a voltage level of the control signal is gradually increased, and said signal level control means gradually brings said semiconductor switch element into conduction.

5. The incandescent lamp illumination circuit according to claim 4, wherein said signal level control means comprises:
        a time-constant circuit including a resistance element and a capacitor;
        said resistance element being interposed between said control signal supply means and said control terminal; and
        said capacitor being interposed between said control terminal and a reference potential.

6. The incandescent lamp illumination circuit according to claim 5, wherein said control signal supply means outputs a pulse signal, and a current direction regulation element is interposed between said control terminal and said capacitor for enabling passage of an electric current during only an ON period of the pulse signal.

7. The incandescent lamp illumination circuit according to claim 6, wherein said current direction regulation element is a diode.

8. The incandescent lamp illumination circuit according to claim 6, wherein a discharge resistance element is connected in parallel with said capacitor.

* * * * *